(12) United States Patent
Overton et al.

(10) Patent No.: US 8,931,398 B2
(45) Date of Patent: Jan. 13, 2015

(54) MODULAR INFUSER WITH CONTINUOUS FILTER BELT

(75) Inventors: Nigel Overton, Melksham (GB); Ian Binder, Chippenham (GB)

(73) Assignee: Crane Merchandising Systems, Inc., Bridgeton, MO (US)

(*) Notice: Subject to any disclaimer, the term of this patent is extended or adjusted under 35 U.S.C. 154(b) by 297 days.

(21) Appl. No.: 12/958,172

(22) Filed: Dec. 1, 2010

(65) Prior Publication Data

US 2011/0129581 A1 Jun. 2, 2011

Related U.S. Application Data

(60) Provisional application No. 61/283,243, filed on Dec. 1, 2009.

(51) Int. Cl.
*A23L 2/38* (2006.01)
*A47J 31/40* (2006.01)

(52) U.S. Cl.
CPC . *A47J 31/408* (2013.01); *A23L 2/38* (2013.01)
USPC ............ 99/289 T; 99/289 R; 99/279; 99/291; 99/300; 99/323; 99/290; 99/323.3; 99/318; 426/425; 426/431; 426/433

(58) Field of Classification Search
CPC .......... A23L 2/38; A47J 31/408; A47J 31/44; A47J 31/002; A47J 31/4403; A23F 3/00; A23F 5/00
USPC ............. 426/425, 431, 433; 99/289 T, 289 R, 99/279, 291, 300, 317, 318, 323.2, 290
See application file for complete search history.

(56) References Cited

U.S. PATENT DOCUMENTS 3,268,119 A * 8/1966 Kopera ...................... 222/129.1
3,306,183 A    2/1967 Richeson
(Continued)

FOREIGN PATENT DOCUMENTS

WO    WO 93/15640 A1    8/1993
WO    WO 2008/011042 A2    1/2008

OTHER PUBLICATIONS

Notification of Transmital of the International Search Report and the Written Opionion of the International Searching Authority, or the Declaration dated Feb. 8, 2011 in connection with International Patent Application No. PCT/US2010/58583.

(Continued)

*Primary Examiner* — Lien T Tran
*Assistant Examiner* — Hong T Yoo

(57) ABSTRACT

A modular infuser includes a back plate assembly containing drive mechanisms and supporting a belt assembly, and infusing and mixing chambers. The belt assembly includes rollers rotating a continuous filter belt in either direction, an annular seal, and a funnel directing liquid to a removable, rotatable spout. The infusing chamber moves between having the bottom clamped to the seal through the filter belt and being spaced apart from the filter belt to allow waste removal by rotation of the filter belt. The mixing chamber receives and mixes ingredient and water, passing the mixture into the infusing chamber below. Replacement of the filter belt with different mesh sizes and of the removable spout with different inner diameters allows the mechanism to be easily adapted for different beverages, such as coffee or tea. Multiple instances of the modular infuser may be mounted in a single vending machine.

20 Claims, 10 Drawing Sheets

(56) References Cited

U.S. PATENT DOCUMENTS

| | | |
|---|---|---|
| 3,357,339 A | 12/1967 | Schaab |
| 3,413,907 A | 12/1968 | Schwertfeger et al. |
| 3,565,641 A | 2/1971 | King |
| 4,134,332 A | 1/1979 | Merman |
| 4,928,584 A | 5/1990 | Young |
| 5,353,692 A | 10/1994 | Reese et al. |
| 5,644,973 A * | 7/1997 | Kang et al. ............ 99/289 R |
| 2008/0038423 A1 | 2/2008 | Klant et al. |

OTHER PUBLICATIONS

Supplementary European Search Report dated Nov. 10, 2014 in connection with European Patent Application No. EP 10 83 5068.

* cited by examiner

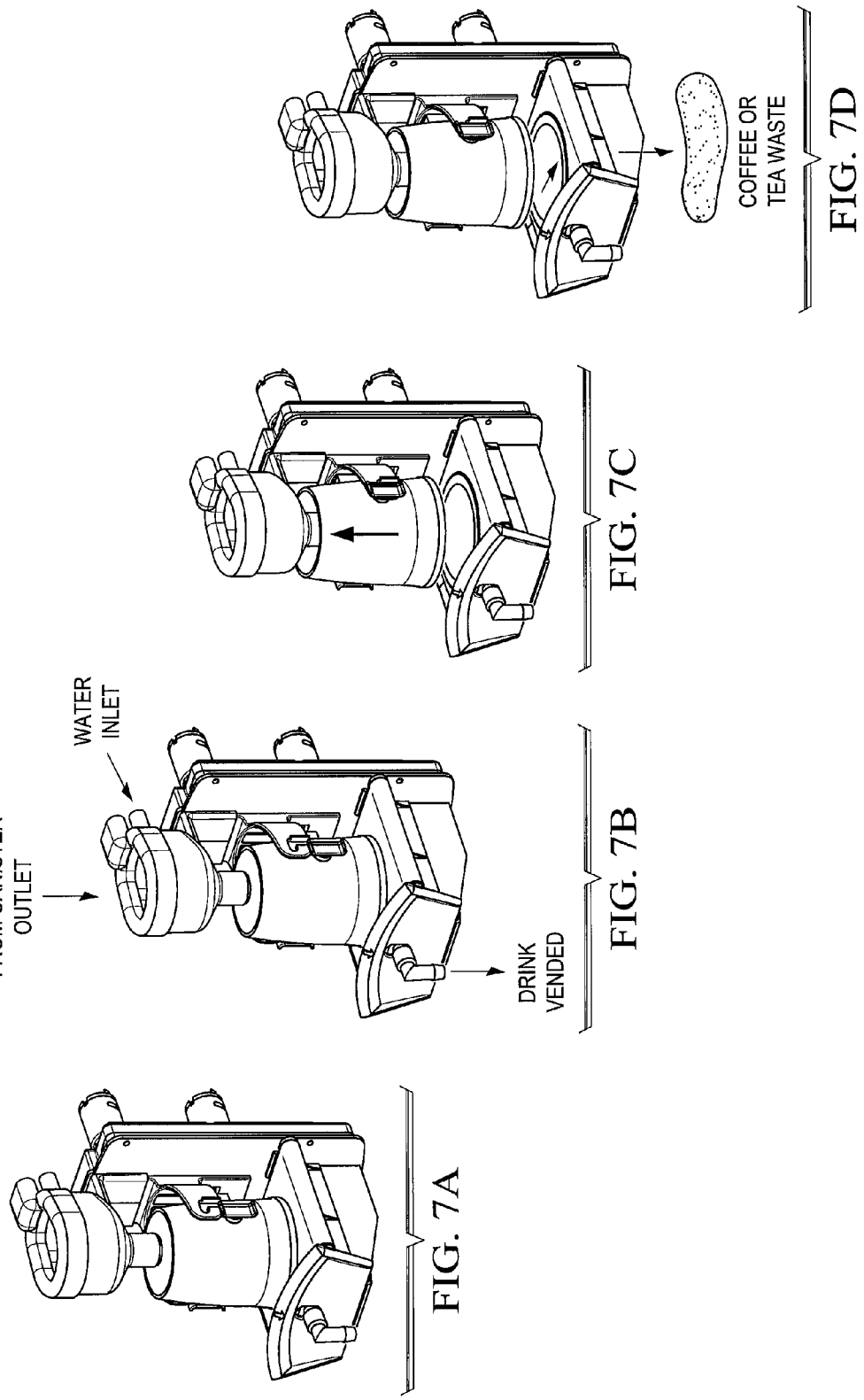

MODULAR INFUSER WITH CONTINUOUS FILTER BELT

PRIORITY CLAIM

This application claims the benefit of the filing date of U.S. Provisional Patent Application Ser. No. 61/283,243 filed Dec. 1, 2009, which is hereby incorporated by reference.

TECHNICAL FIELD

The present application relates generally to infusing machines and, more specifically, to a modular infuser with a continuous filter belt.

BACKGROUND

Hot or cold beverages brewed or infused from a variety of sources, such as coffee grounds, cocoa powder, tea and/or other leaves, or various roots, are increasingly popular worldwide. Various systems for brewing or infusing such beverages have been marketed or proposed. Essentially all such systems have failed to: provide outstanding drink quality with the lowest product grams possible, demonstrate reliability measured by the number of service calls required per year, consistently deliver beverages at desired temperatures, consistently deliver beverages within an acceptable period of time, and/or allow a range of drink sizes to be delivered. In addition, commercially available systems are generally not capable of infusing more than one type of product (ground beans, powder, leaves, roots, etc.).

There is, therefore, a need in the art for a modular infusing system providing improved performance in beverage delivery.

SUMMARY

A modular infuser includes a back plate assembly containing drive mechanisms and supporting a belt assembly, and infusing and mixing chambers. The belt assembly includes rollers rotating a continuous filter belt in either direction, an annular seal, and a funnel directing liquid to a removable, rotatable spout. The infusing chamber moves between having the bottom clamped to the seal through the filter belt and being spaced apart from the filter belt to allow waste removal by rotation of the filter belt. The mixing chamber receives and mixes ingredient and water, passing the mixture into the infusing chamber below. Replacement of the filter belt with different mesh sizes and of the removable spout with different inner diameters allows the mechanism to be easily adapted for different beverages, such as coffee or tea. Multiple instances of the modular infuser may be mounted in a single vending machine.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A through 7D illustrate operation of a modular infuser with continuous filter belt according to one embodiment of the present disclosure.

DETAILED DESCRIPTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged vending machine currency handling system.

Figure 1A:
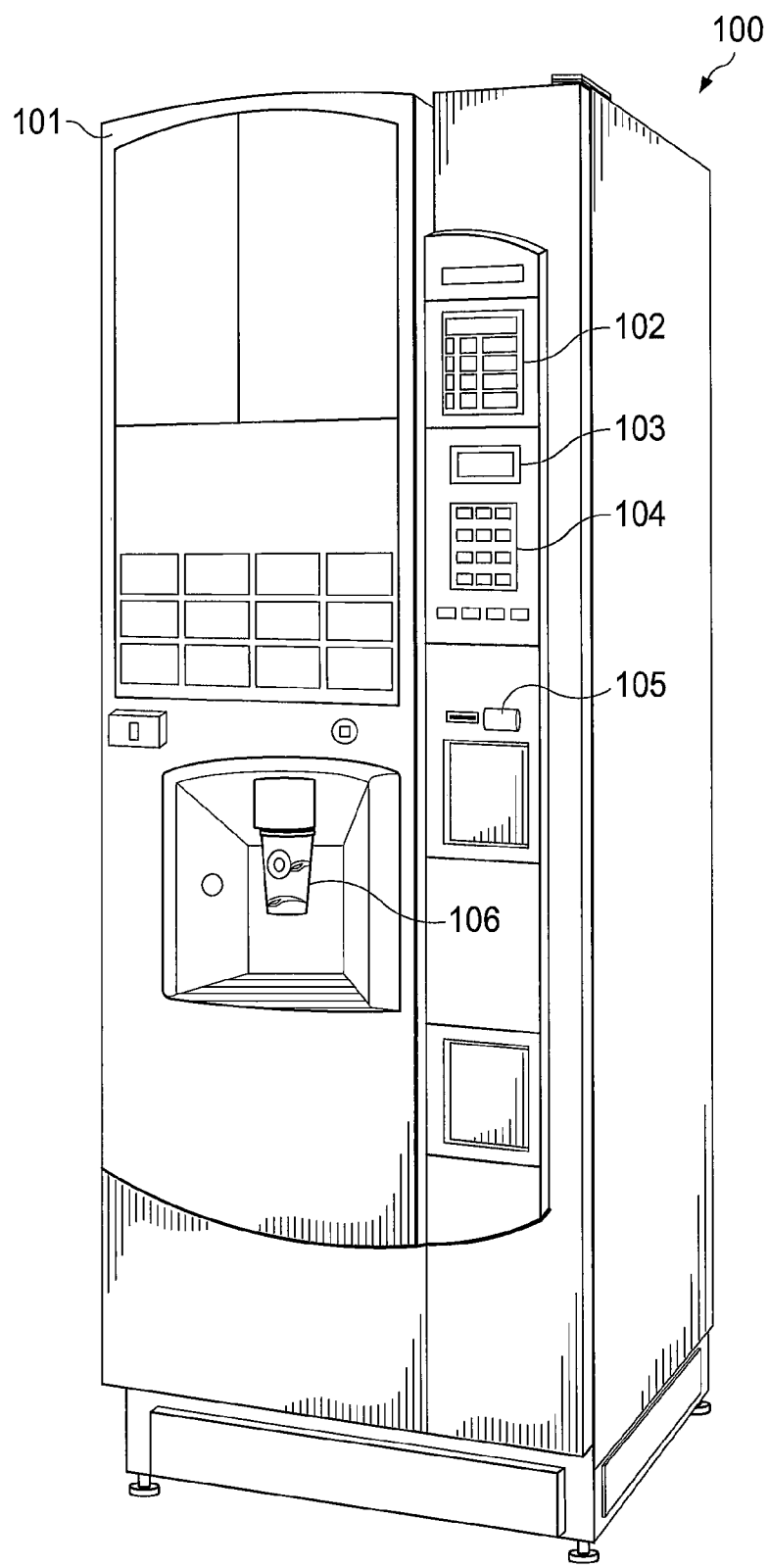
FIGS. 1A and 1B are illustrations of beverage vending machines each including one or more modular infusers with a continuous filter belt according to one embodiment of the present disclosure.

FIG. 1A is an external view of a beverage vending machine including one or more modular infusers with a continuous filter belt according to one embodiment of the present disclosure. The vending machine 100 includes a free-standing cabinet 101 with an external instruction placard 102, a liquid crystal display (LCD) 103, selection buttons 104, a payment system 105 and a delivery station 106. Hoppers within the enclosure hold product (ingredients) to be used during infusing, and a cup turret and cup delivery mechanism may also be included.

In operation, a customer deposits money into the payment system 105, which is held in escrow by the vending machine 100 while the customer makes a selection. The instruction placard 102 and text or graphics displayed on LCD 103 assist the customer in making their beverage selection using selection buttons 104. The placard 102 may provide general instructions regarding beverage and ingredient selection while additional graphics highlight specialty infusing and ingredient (e.g., flavorings) selections to make a particular beverage. In response to the customer's selections, the vending machine 100 delivers a cup to the delivery station 106, brews the selected beverage, and delivers the beverage to the cup at the delivery station 106. Upon delivery of the selected beverage, the payment system 105 releases any escrowed funds into a cash storage.

Figure 1B:
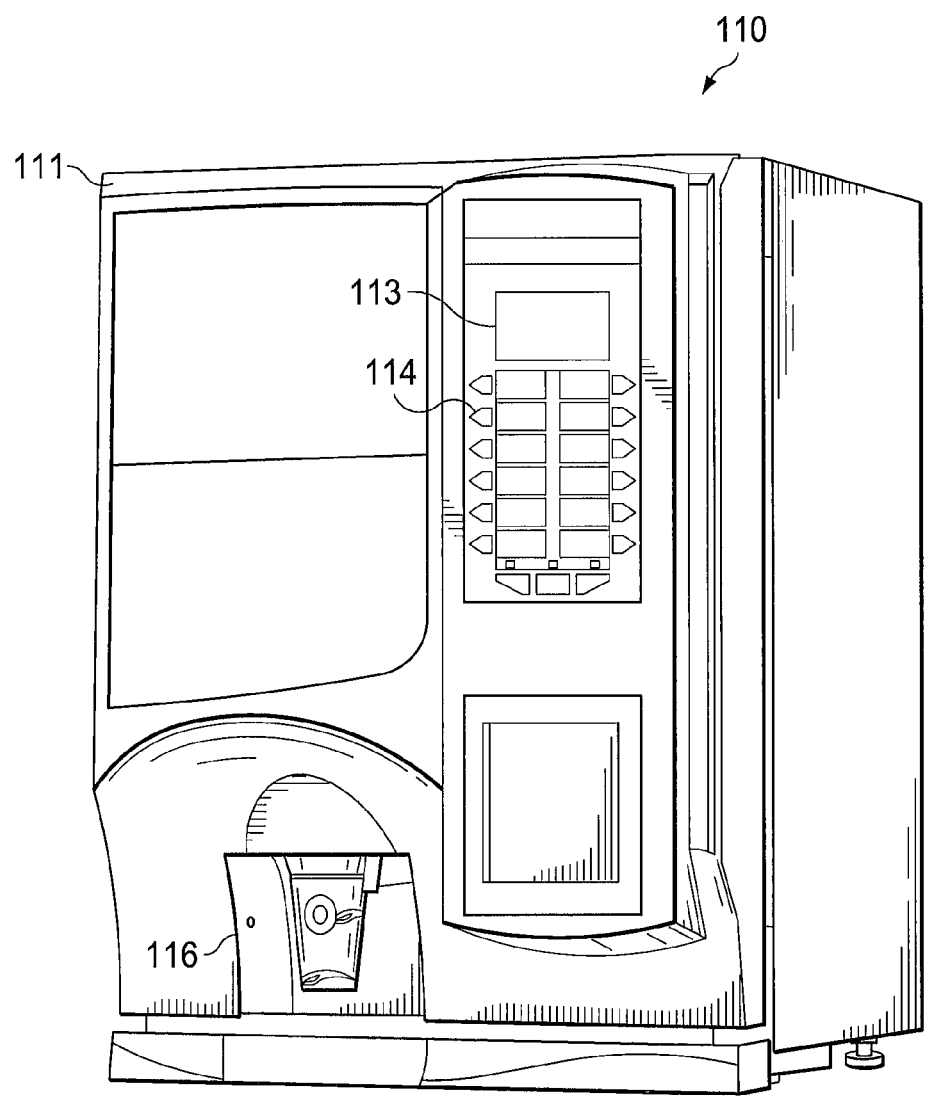

FIG. 1B is an external view of an alternate design of a beverage brewing machine including one or more modular infusers with a continuous filter belt according to one embodiment of the present disclosure. Beverage brewing machine 110 is a countertop design including a cabinet 111, an LCD display 113, selection buttons 114 and a delivery station 116. Beverage brewing machine 110 may be used as a retail food establishment such as a restaurant to brew beverages for customers, or in an office environment to brew beverages for employees. Accordingly, the payment system and cup turret/cup delivery system are not necessary for beverage brewing machine 110.

Those skilled in the art will recognize that the complete construction and operation of the beverage vending machine 100 and/or the beverage brewing machine 110 is not depicted or described herein. Instead, for simplicity and clarity, only so much of the beverage vending machine 100 and/or the beverage brewing machine 110 as is unique to the present disclosure or necessary for an understanding of the present disclosure is depicted and described.

Figure 2:
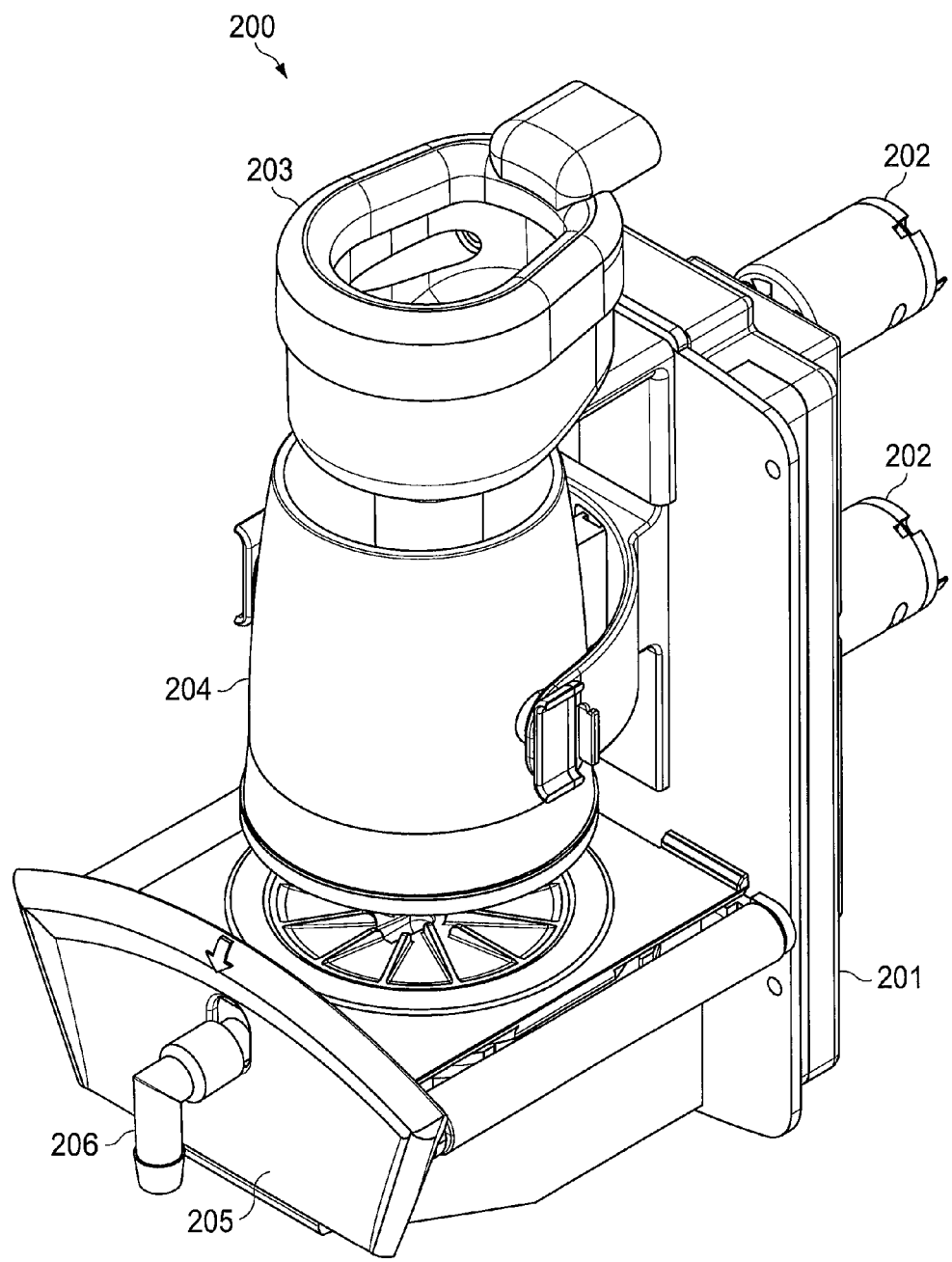
FIG. 2 is a perspective view of assembled components within a modular infuser with continuous filter belt according to one embodiment of the present disclosure.
Figure 3A:
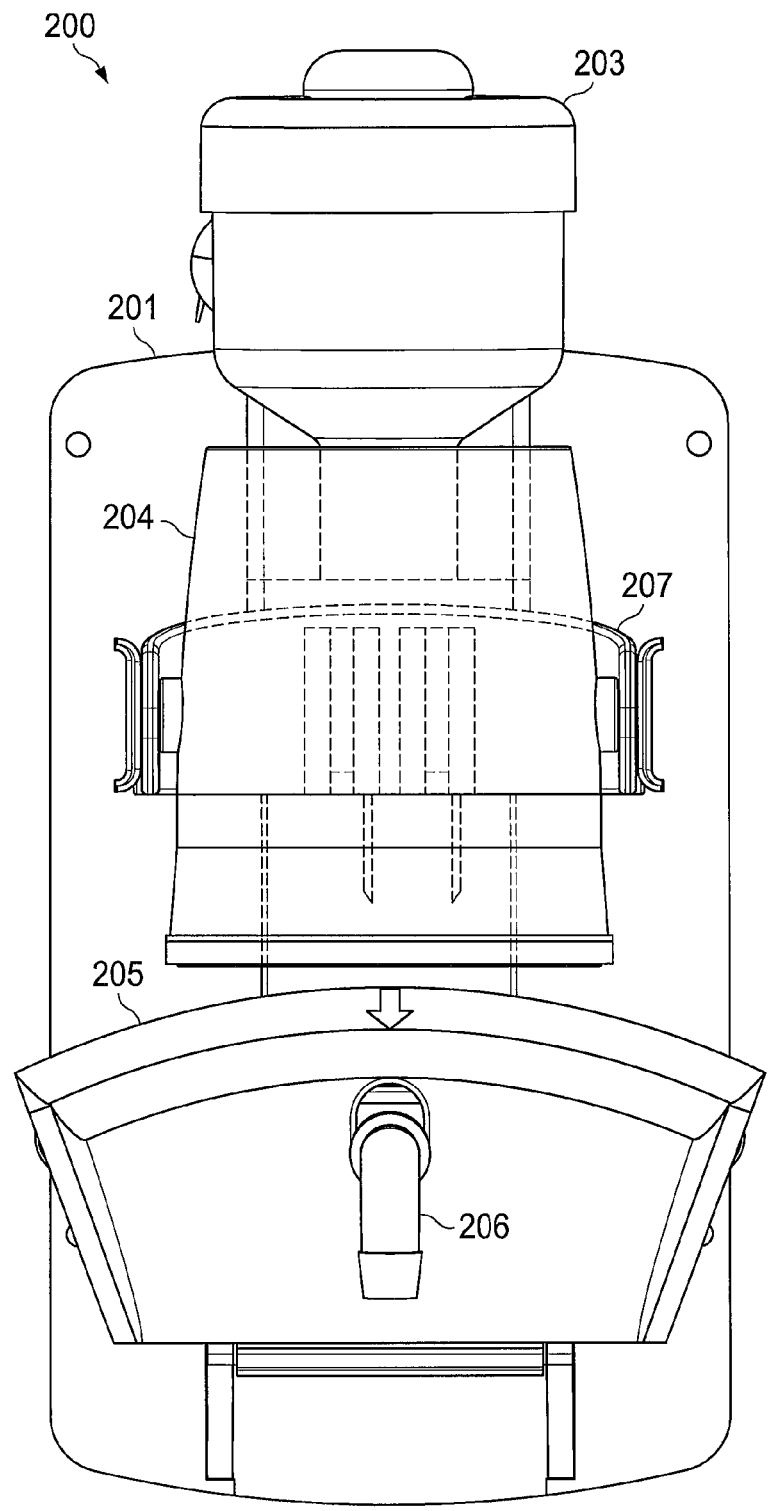
FIGS. 3A and 3B are front and side elevation views, respectively, of the same structure depicted in FIG. 2.
Figure 3B:
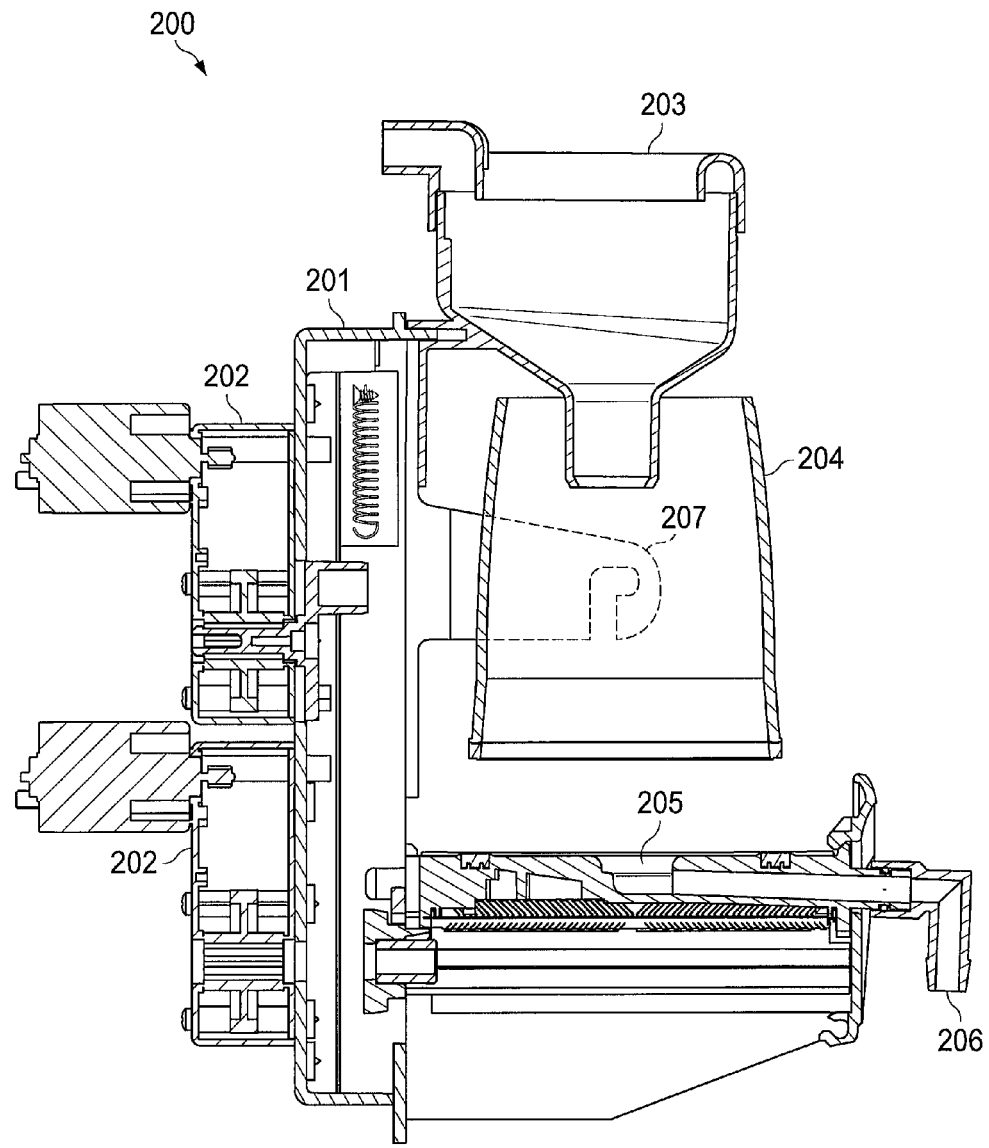

FIG. 2 is a perspective view of assembled components within a modular infuser with continuous filter belt according to one embodiment of the present disclosure. FIGS. 3A and 3B are front and side elevation views, respectively, of the same structure depicted in FIG. 2. Modular infuser 200 is mounted within the cabinets 101, 111 of beverage vending machine 100 and/or the beverage brewing machine 110, either or both of which may include two instances of modular infuser 200. Internal components for modular infuser 200 are depicted in FIGS. 2, 3A and 3B, although those skilled in the art will recognize that a complete infuser will generally include a number of additional components not shown.

Modular infuser 200 includes a vertical back plate assembly 201 that is formed from an assembly of various moldings and that contains all gearing necessary to control the functionality of the system as described in further detail below. Mounting points are also provided by the back plate assembly 201 for mounting the internal components depicted within an enclosure (cabinet 101 or 111). Thus, the rear face of the back plate assembly 201 preferably includes (at least) four fixing points for mounting onto the module's metalwork. A motor assembly 202 also mounts on the rear face of the back plate assembly 201 and drives the moving assemblies. In the example shown, the motor assembly 202 includes twin motors to simplify internal moving parts and provide greater flexibility in terms of timings.

Upper chamber 203 is used for mixing water and ingredients and extracting steam. Lower, infusing chamber 204 (shown in phantom in FIGS. 3A and 3B) allows product to be filtered and moves open to allow the filter belt assembly 205 to discharge waste product. Filter belt assembly 205 acts as a dispensing funnel and has the filter belt mesh attached, rotating to expel waste. Upper and lower chambers 203, 204 and filter belt assembly 205 mount on the front of back plate assembly 201. The interface for the lower chamber 204 is located centrally relative to the width of the back plate assembly 201. The interface moves the lower chamber 204 vertically into and out of contact with the filter belt.

Belt assembly 205 allows the continuous filter belt to be driven in either direction, allowing waste ejection in either direction and permitting the internal components to be positioned against either side panel of the cabinet enclosure with waste discharge in only one direction, regardless of which side panel abuts the internal components. Belt assembly 205 drives the filter belt and provides tension to the belt. Belt assembly 205 includes a funnel molding with a bottom center exit hole feeding a removable, rotatable outlet spout 206, through which infused or brewed drink is extracted. Different spouts are provided to back up the water to different degrees and potentially assist with steeping, depending on the type of infused food product. A extraction pump may be situated to dispense beverage directly or directed to a mixing station should whipped beverage be required. To achieve this, the lower chamber should be easily changed using a snap-in-place system, with a belt assembly replaceable with a larger funnel and the outlet spout low enough to accommodate a larger lower chamber. Thus, the overall geometry and dimensions should be calculated taking into account both small and large drink sizes.

Belt assembly 205 is easily removable with an ergonomic handle unlatching the belt assembly 205 from the back plate assembly 201 for removal. Different sized or different shaped belt assemblies may thus be used within modular infuser 200, as described in further detail below.

Figure 4A:
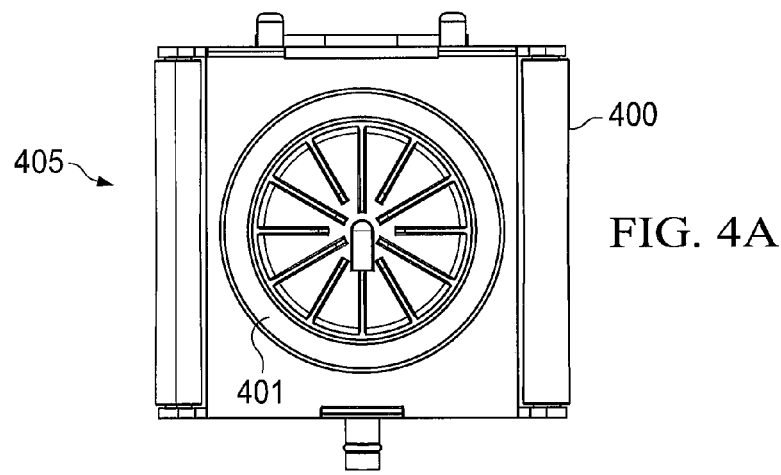
FIGS. 4A, 4B and 4C depict a top plan view, a perspective view, and a bottom plan view, respectively, of portions of a belt assembly for a continuous filter belt within the modular infuser of FIGS. 2, 3A and 3B.
Figure 4B:
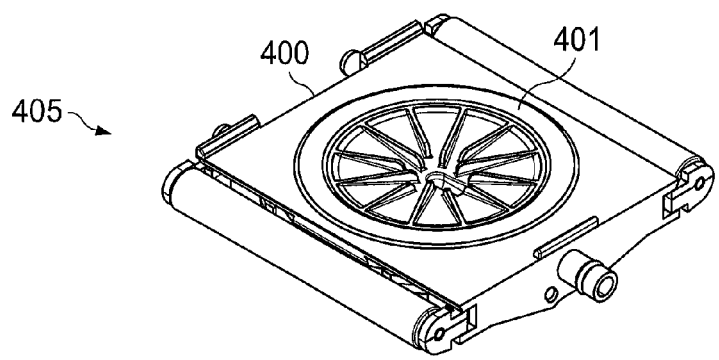
Figure 4C:
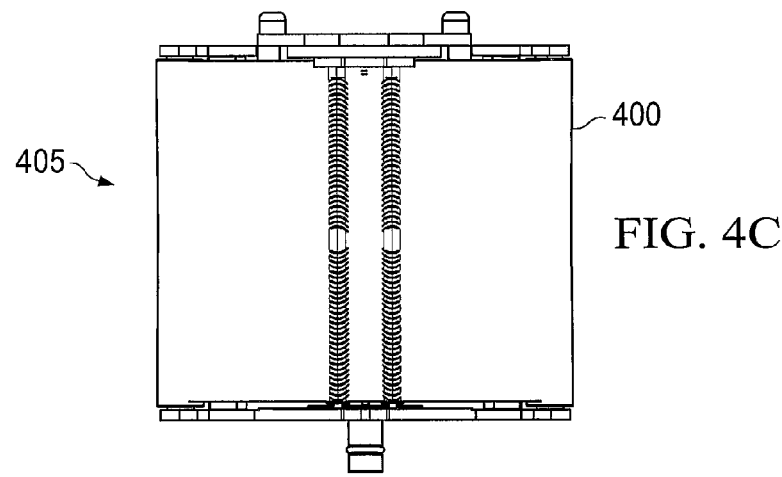

FIGS. 4A, 4B and 4C depict a top plan view, a perspective view, and a bottom plan view, respectively, of portions of a belt assembly for a continuous filter belt within the modular infuser of FIGS. 2, 3A and 3B. The continuous filter belt 400 is supported in the exemplary embodiment by three rollers, one on each side and one at the bottom center, which can be rotated either clockwise or counterclockwise. The rollers are mounted on a molded structure forming the funnel through which infused beverage is dispensed. The main drive roller, which is preferably but not necessarily the center roller, should have a smooth, rubber outer surface to give traction between the main drive roller and the filter belt. The main drive roller has a drive coupling interfaced via the gears within the back plate assembly 201 to the motors.

A wide ring-shaped seal 401 is inset in the funnel molding and sized to conform to the lower chamber 204. The lower chamber 204 clamps to seal 401 with the filter belt between the bottom edge of the lower chamber and the seal. A center exit hole within the funnel molding feeds the spout, and radial ribs within the funnel prevent belt sagging. Variations of the funnel molding may be used in the same modular infuser 200, with some variants being as shallow as possible to help with tea steeping time. For example, one funnel molding has 4 millimeter (mm) deep sides with a 10° run off. A different variant of the funnel molding for use in the same modular infuser 200 will have deeper sides and a steeper run off angle. Different instances of modular infuser 200 within a single beverage vending machine 100 or beverage brewing machine 110 may include different funnel moldings.

Variations of the filter belt 400 are defined for each type of food product used for infusion. Variations include the size of mesh openings and mesh thickness. Metallic filter belts are preferably laser cut and ultrasonically welded to avoid frayed edges. An interface at the rear of the belt assembly 205 (e.g., a handle or latch) loosens the filter belt when activated to allow for removal. For example, a moving roller (i.e., other than the drive roller) can be shifted inward to loosen the filter belt for removal. Within the belt assembly 205, the filter belt 400 should be positioned just above the O-ring seal 401, with some slight clearance when no infused product is resting on the filter belt to help prevent sticking.

Referring back to FIGS. 2, 3A and 3B, the lower chamber 204 easily snaps into position within mounting bracket 207. The bottom lip of the lower chamber 204 includes a seal, and preferably has a lower lip angled or slanted outward to help product cake waste fall away. The entire lower chamber 204 should have smooth finished surfaces to avoid dirt traps and make it easy to clean. The lower chamber 204 clamps down onto the seal 401, with filter belt 400 therebetween, to form a water-tight seal before vending (beverage dispensing) occurs. The clamping action is preferably spring loaded via the translation provided by back plate assembly 201 to prevent overtightening and damage to the filter belt 400 if the product waste is resting on the filter belt 400. Once vending is complete, the lower chamber 204 moves up to allow a gap (e.g., approximately 27 mm) between the lower edge of the lower chamber 204 and the filter belt 400, creating space to allow product waste to pass. Movement of the lower chamber 204 from the lowermost position, clamped to the filter belt 400 and seal 401, to the uppermost position should be by snap action to ensure that any lingering product cake waste is shaken off.

The lower chamber 204 and the belt assembly 205 mount to the front side of back plate assembly 201, with interfaces to the gears in the back plate assembly 201 and the motor assembly 202. The gears within the back plate assembly 201 control movement of the lower chamber 204 and drive the filter belt 400. The interface from the lower chamber 204 into the back plate assembly 201 should be located as high as possible to help prevent any water spillage from entering the mechanisms within the back plate assembly 201. The lower chamber 204 snaps into position on the mounting brackets forming a portion of the interface and moving the lower chamber 204 up and down. When "closing" the lower chamber 204 (moving into the down position), the interface to the lower chamber 204 applies the relevant pressure to ensure a water tight seal with seal 401. The lower chamber 204 is held in place in the closed position under a spring-loaded tension. When "opening" the lower chamber (movement from the down position to the up position), the interface provides a snap action at the start of the opening cycle to enable any waste product to be shaken off before belt movement. The height of the lower chamber 204 in the exemplary embodiment is 205 mm, the overall width is no more than 120 mm, and the travel distance is 27 mm.

Figure 5A:
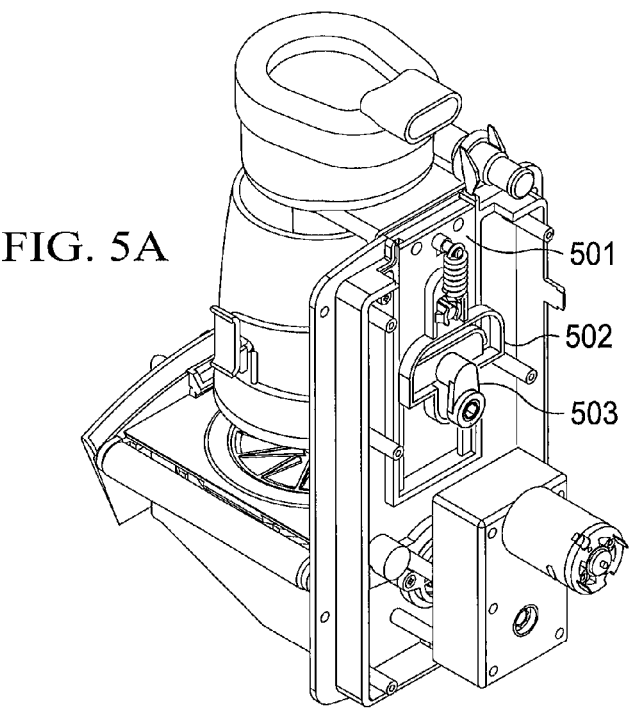
FIGS. 5A and 5B are rear views of selected portions of the modular infuser of FIGS. 2, 3A and 3B.
Figure 5B:
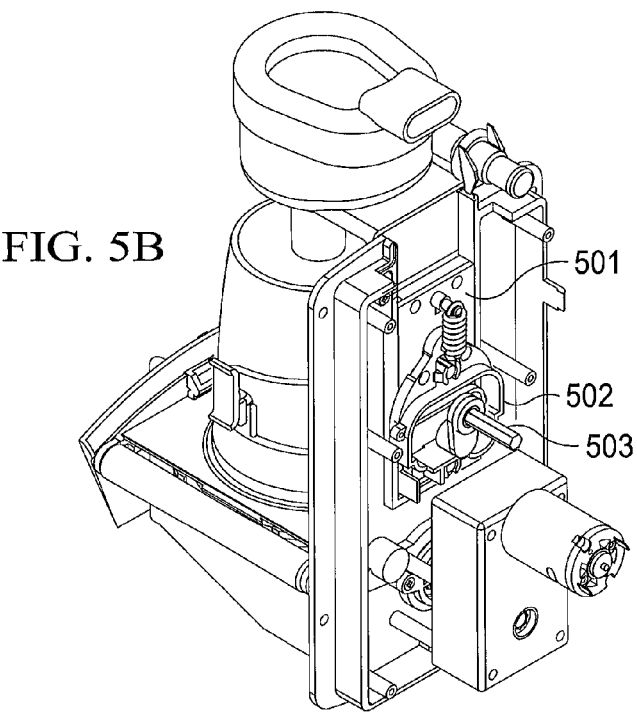

FIGS. 5A and 5B are rear views of selected portions of the modular infuser of FIGS. 2, 3A and 3B. The water inlet on the side of the'mixing chamber is depicted in FIG. 5A, as well as mounting of the upper chamber 203 on the back plate assembly. Portions of the drive mechanisms employed to move the lower chamber and the belt are also illustrated in both figures. FIG. 5B shows the lower chamber fully closed and clamped onto the filter belt, ready to vend beverage. Alternate designs for movement of the lower chamber are depicted in FIGS. 5A and 5B. In both cases, however, one component 501 moves the lower chamber and another component 502 is actuated by a motor cam 503, with the two components 501 and 502 being linked by a spring that allows the motor cam to fully turn but which will not fully close the lower chamber if an obstruction is encountered. This design helps ensure long part life (preferably a mean time before failure of 250,000 brews) by avoiding stressing components.

Figure 6A:
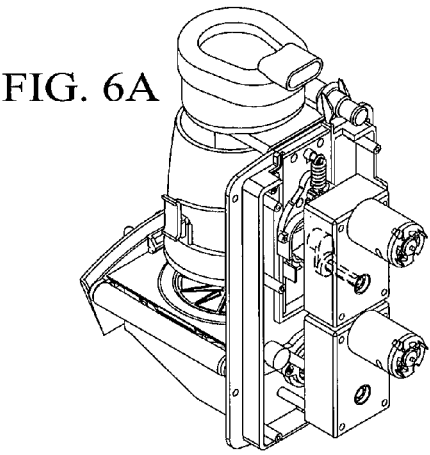
FIGS. 6A through 6E illustrate movement of the lower chamber in response to rotation of the motor cam in the modular infuser of FIGS. 2, 3A and 3B.
Figure 6B:
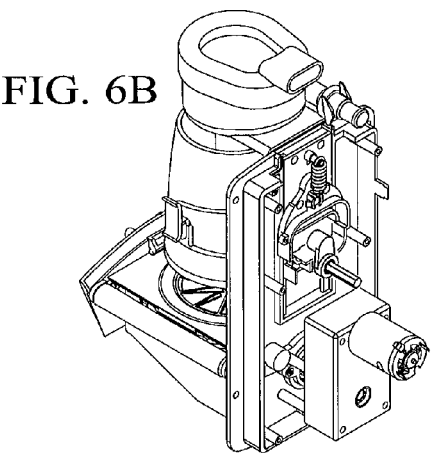
Figure 6C:
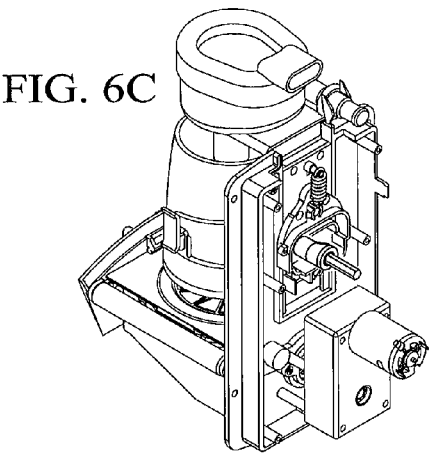
Figure 6D:
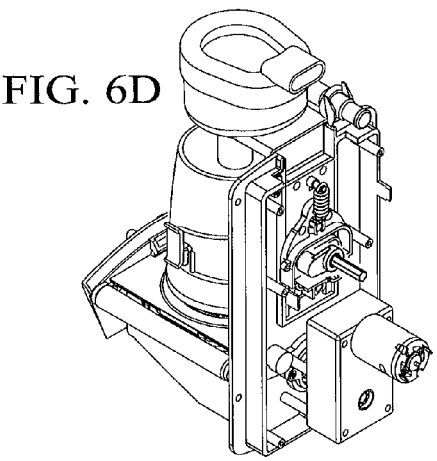
Figure 6E:
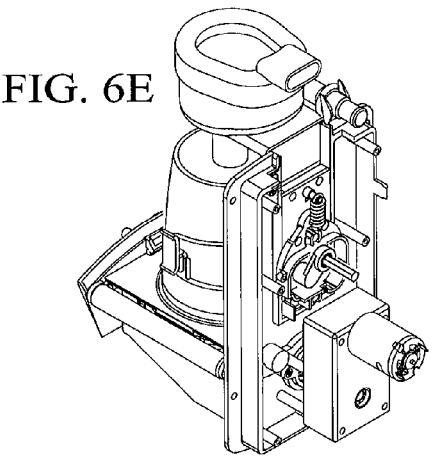

FIGS. 6A through 6E illustrate movement of the lower chamber in response to rotation of the motor cam within the modular infuser of FIGS. 2, 3A and 3B. FIG. 6A shows the lower chamber in the fully open position (with the motor in phantom for clarity), with the remaining figures showing the progression of the motor cam 503, the components 501 and 502 and the lower chamber 204 until the lower chamber is in the fully closed position as shown in FIG. 6E.

FIGS. 7A through 7D illustrate operation of a modular infuser with continuous filter belt according to one embodiment of the present disclosure. In FIG. 7A, the infuser is in an inactive state with the lower chamber 204 positions just above the belt 400 to avoid sticking, but in a position that helps speed vend time. In FIG. 7B, the lower chamber 204 is lowered to the vend position, clamped on belt 400, while tea or coffee (or other product) is introduced into the mixing chamber through the central opening in the steam hood and water is introduced through the water inlet on the side of upper chamber 203. Those ingredients are mixed by whirlpool or vortex action within the mixing chamber, and pass from the mixing chamber into the lower chamber 204. For coffee, a extraction pump draws the coffee out of the lower chamber 204 to vend through the spout, while for tea the beverage is dispensed through the spout by gravity.

As illustrated in FIG. 7C, once beverage vending is complete, the lower chamber 204 moves up into the open position, ready to expel waste coffee or tea resting on the belt 400. In FIG. 7D, the belt 400 rotates for waste ejection, with a wiper 504 scraping the waste off belt 400 to fall into a waste bucket (not shown). The lower chamber 204 then returns to the rest position of FIG. 7A, ready to vend.

Figure 8:
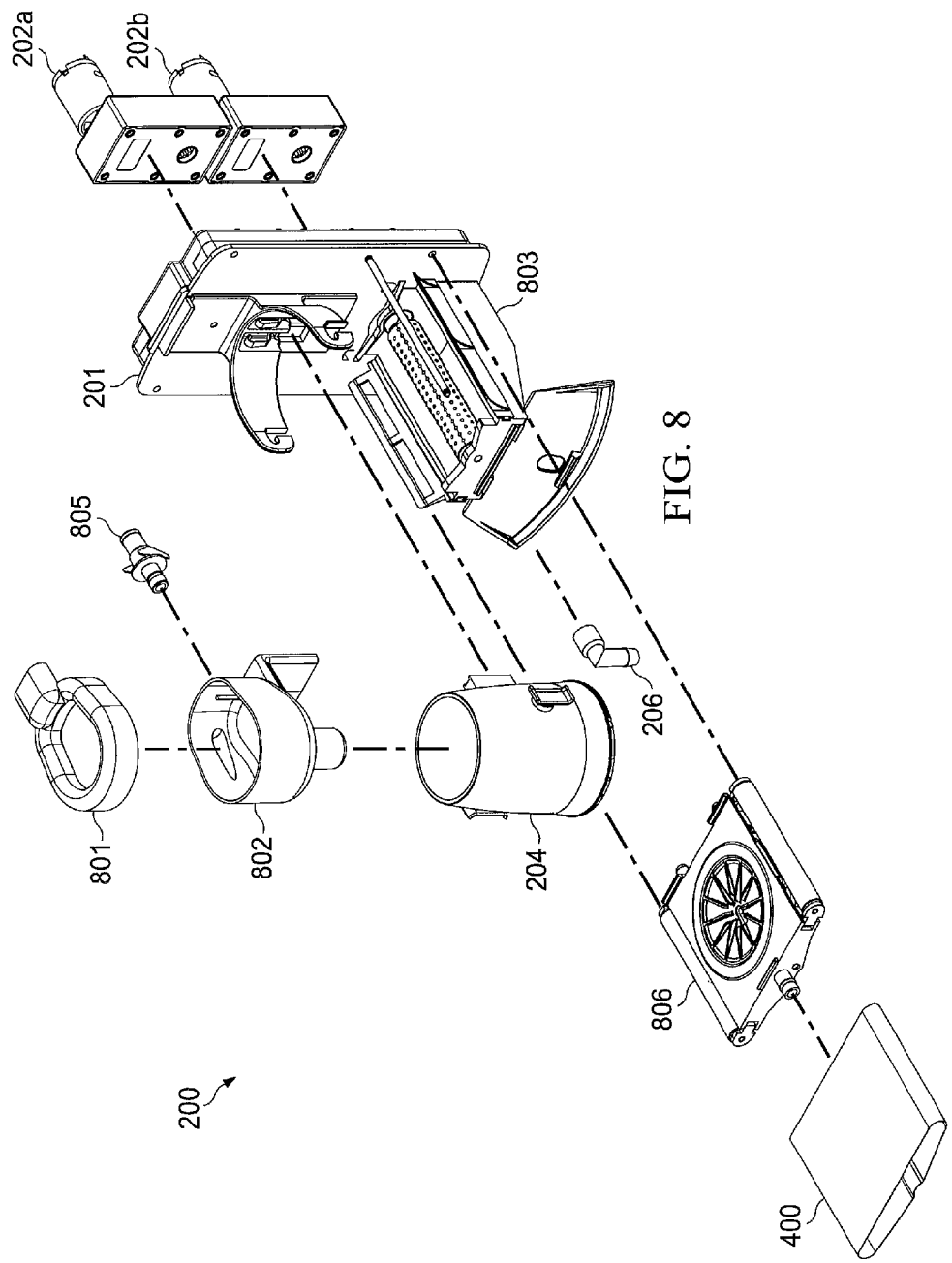
FIG. 8 is an exploded view of components for a modular infuser with continuous filter belt according to one embodiment of the present disclosure.

FIG. 8 is an exploded view of components for a modular infuser with continuous filter belt according to one embodiment of the present disclosure. The upper chamber 203 includes a steam hood 801 that fits onto the top of the mixing chamber 802 and helps extract steam into the machine's steam tray. This helps prevent steam from causing blockages in canister outlets. The mixing chamber portion 802 of upper chamber 203 is for mixing water and ingredients. The ingredient is fed into the top aperture in steam hood 801 at the same time water is fed into a water inlet tube on the side of the mixing chamber 802, near the top. The product is mixed by a vortex or whirlpool type action within mixing chamber 802, created by the inflowing water and the internal shape of the mixing chamber 802. A funnel type bottom outlet with clean edges assists in making the water exit in a vortex manner. The upper chamber 203 requires support from the back plate assembly 201.

Two fixed wiper arms 803 brush against the belt 400 on the funnel molding of the belt assembly 205 and clean off any waste product cake on the belt. Arms 803 are provided on either side to facilitate the belt being driven either clockwise or counter-clockwise. Each motor 202a and 202b mounts onto the back of the back plate assembly 201. A 24 volt DC motor with sufficient torque to provide appropriate clamping of the lower chamber 204 to the belt 400 should be employed. The gears within the back plate assembly 201 are designed to drive the belt either clockwise or counterclockwise, in a direction controlled by the electronic output to the motor 202 via the machine input/output (I/O) printed circuit board (PCB).

The compact infuser allows multiple infusion or brewer systems to be fit into a single machine. The reversible belt direction allows flexibility in machine layout and optimal waste collection for a particular application.

The modular infuser 200 includes back plate assembly 201 with simple internal workings, as water proof as possible, and easy to clean, avoiding dirt traps. Two motors 202a and 202b mount on the rear of back plate assembly 201, with motor 202a (e.g., 24 VDC, 30 rpm) driving vertical chamber movement and motor 202b (e.g., 24V DC, 50 rpm) driving belt movement clockwise or counterclockwise.

Mixing chamber 802 and steam hood 801 form the upper chamber for mixing water and ingredient, which mixture is then funneled into the lower chamber. A male-to-female adaptor 805 with an easy fit and low leakage may be used with the inlet to the upper chamber. Push-in-place components that are easily removed and cleaned are preferred. Lower chamber 204 has a height of 90 mm and internal diameter of 70 mm (for United Kingdom/European Union, 83 mm for United States) and provides drink infusing. Lower chamber 204 has a belt interface on the lower rim and mounts by quick release snap onto the back plate assembly 201.

The filter mesh belt 400 comes in coffee and tea versions, and is an easily changed, low cost part. Pull-off spout 206 pivots for optimum drink delivery, and is provided in a 6 mm inner diameter version for coffee, 4 mm inner diameter version for tea. The belt mount assembly 806 (including the rollers) has a wide, inset seal, a belt tensioning handle on the rear, two outer belt tracking rollers and two lower drive interface rollers.

The modular infuser described above is designed for fresh brew drinks in sizes ranging up to 20 ounces, preferably providing outstanding drink quality with the lowest amount of ingredient per beverage, good reliability (as measured by number of service calls per year) with reduced operating costs through reduced service/maintenance time, and optimal beverage temperature (water temperature through the infuser up to 98° F.) and vend speed.

The design of the modular infuser includes a continuous filter belt system and an overall modular design with easy removal of key components and simple complete disassembly using only a screwdriver. The design is easy to clean and free of dirt traps, with key parts color coded to guide cleaning requirements. The infuser is capable of dispensing pre-ground beverage infusing food products (beans, roots, leaves, flowers, etc.) through filter mesh calibrated for each food product. The compact design allows multiple instances of the system to be included in a single vending machine, or a single system in a small footprint vending machine.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A modular infuser system, comprising:
    a back plate assembly;
    a belt assembly mounted on a front of the back plate assembly and supporting a continuous filter belt having a first mesh size, the belt assembly configured to rotate the continuous filter belt either clockwise or counterclockwise, one direction at a time,
    wherein the belt assembly includes an annular seal below a portion of the continuous filter belt and a funnel molding directing liquid passing through the filter belt toward a spout, and
    wherein the belt assembly is configured to permit removal of the continuous filter belt and replacement with a second continuous filter belt having a second mesh size different than the first mesh size; and
    an infusing chamber movably mounted on the front of the back plate assembly above the belt assembly and configured to be selectively moved between a clamped position in which a bottom of the infusing chamber clamps to the seal through the continuous filter belt and a raised position in which the bottom of the infusing chamber is spaced apart from the continuous filter belt,
    wherein rotation of the continuous filter belt in either direction while the infusing chamber is in the raised position removes waste from the continuous filter belt,
    wherein the spout is configured to direct liquid from the infusing chamber and to back up the liquid within the infusing chamber to a first amount when the infusing chamber is clamped to the seal,
    wherein the funnel molding is configured to permit removal of the spout and replacement with a second spout configured to back up the liquid within the infusing chamber to a second amount when the infusing chamber is clamped to the seal.

2. The modular infuser system of claim 1, wherein the belt assembly further comprises:
    a belt support removable from the funnel molding and including two outer tracking rollers and at least one lower drive roller, the filter belt fitted to pass under tension around the tracking and drive rollers and moved by rotation of the at least one lower drive roller.

3. The modular infuser system of claim 2, further comprising:
    at least one motor mounted to a rear of the back plate assembly, the at least one motor driving one or more of a cam moving the infusing chamber between the clamped and raised positions and a drive shaft for rotating the at least one lower drive roller.

4. The modular infuser system of claim 3, wherein the at least one motor comprises:
    two motors, a first motor driving the cam moving the infusing chamber between the clamped and raised positions and a second motor driving the drive shaft for rotating the at least one lower drive roller.

5. The modular infuser system of claim 1, further comprising:
    a mixing chamber mounted on the front of the back plate assembly above the infusing chamber and configured to receive ingredient(s) through an upper central opening and liquid through an inlet, a mixing chamber configured to mix the ingredient(s) and the liquid via vortex action and pass the mixture of the ingredients and the liquid through a funnel outlet into the infusing chamber.

6. The modular infuser system of claim 5, further comprising:
    a steam hood fitting onto a top of the mixing chamber and configured to assist in extracting steam.

7. The modular infuser system of claim 1, wherein the infusing chamber has a snap-action attachment to a movable mounting bracket on the back plate assembly.

8. A beverage infusing machine including at least one of the modular infuser systems of claim 1, the beverage infusing machine further comprising:
    a cabinet housing the at least one modular infuser system;
    a delivery port in the cabinet to which a beverage brewed in the at least one infusing chamber is delivered through the spout;
    selection keys on the cabinet configured to allow a user to select the beverage brewed in the at least one infusing chamber.

9. The modular infuser system of claim 1, wherein the first mesh size and the first spout enable the infusing chamber to brew a first beverage, and wherein the second mesh size and the second spout enable the infusing chamber to brew a second beverage different than the first beverage.

10. A modular infuser system, comprising:
a back plate assembly;
a belt assembly mounted on a front of the back plate assembly and supporting a continuous filter belt, the belt assembly configured to rotate the continuous filter belt either clockwise or counterclockwise, one direction at a time, the belt assembly including an annular seal below a portion of the continuous filter belt and a funnel molding directing liquid passing through the filter belt toward a spout;
an infusing chamber movably mounted on the front of the back plate assembly above the belt assembly and configured to be selectively moved between a clamped position in which a bottom of the infusing chamber clamps to the seal through the continuous filter belt and a raised position in which a bottom of the infusing chamber is spaced apart from the continuous filter belt,
wherein rotation of the continuous filter belt in either direction while the infusing chamber is in the raised position removes waste from the continuous filter belt;
a first wiper arm and a second wiper arm disposed on opposite sides of the funnel molding and positioned to brush against the filter belt to remove waste from the filter belt,
wherein when the filter belt rotates clockwise, the waste disposed on the filter belt moves to a first of the opposite sides of the funnel molding, and the first wiper arm removes the waste from the filter belt, and
when the filter belt rotates counterclockwise, the waste disposed on the filter belt moves to a second side of the funnel molding opposite to the first of the opposite sides of the funnel molding, and the second wiper arm removes the waste from the filter belt.

11. A method of operating at least one modular infuser system including a back plate assembly, a belt assembly mounted on a front of the back plate assembly and supporting a continuous filter belt, the belt assembly configured to rotate the filter belt in two opposite directions, only one direction at a time,
wherein the belt assembly includes an annular seal below a portion of the filter belt and a funnel molding directing liquid passing through the filter belt toward a spout, and an infusing chamber movably mounted on the front of the back plate assembly above the belt assembly,
wherein the spout is configured to direct the liquid from the infusing chamber and to back up the liquid within the infusing chamber to one of a first amount and a second amount different than the first amount when the infusing chamber is clamped to the seal, the method comprising:
prior to brewing of a beverage, inserting a continuous filter belt having a mesh size selected from at least a first mesh size and a second mesh size in the belt assembly and installing the spout configured to back up the liquid within the infusing chamber to a selected amount when the infusing chamber is clamped to the seal, the selected amount selected from at least a first amount and a second amount different than the first amount;
during brewing of a beverage, selectively moving the infusing chamber between a clamped position in which a bottom of the infusing chamber clamps to the seal through the filter belt and a raised position in which the bottom of the infusing chamber is spaced apart from the filter belt; and
rotating the filter belt in either of the two opposite directions while the infusing chamber is in the raised position to remove waste from the filter belt.

12. The method of claim 11, wherein the belt assembly includes a belt support removable from the funnel molding and including two outer tracking rollers and at least one lower drive roller, the filter belt fitted to pass under tension around the tracking and drive rollers, the method further comprising:
moving the filter belt by rotation of the at least one lower drive roller.

13. The method of claim 12, further comprising:
using at least one motor mounted to a rear of the back plate assembly, driving one or more of a cam moving the infusing chamber between the clamped and raised positions and a drive shaft for rotating the at least one lower drive roller.

14. The method of claim 13, wherein using at least one motor mounted to a rear of the back plate assembly comprises:
using a first motor driving the cam moving the infusing chamber between the clamped and raised positions; and
using a second motor driving the drive shaft for rotating the at least one lower drive roller.

15. The method of claim 11, further comprising:
receiving ingredient(s) through an upper central opening of a mixing chamber mounted on the front of the back plate assembly above the infusing chamber; and
receiving liquid through an inlet on a side of the mixing chamber, the mixing chamber configured to mix the ingredient(s) and the liquid via vortex action and pass a mixture of the ingredients and the liquid through a funnel outlet into the infusing chamber.

16. The method of claim 15, further comprising:
facilitating extraction of steam with a steam hood fitting onto a top of the mixing chamber.

17. The method of claim 11, wherein the infusing chamber has a snap-action attachment to a movable mounting bracket on the back plate assembly.

18. The method of claim 11, further comprising:
forming a beverage infusing machine including the at least one modular infuser system with a cabinet housing the at least one modular infuser system;
delivering a beverage brewed in the at least one infusing chamber to a delivery port through the spout;
receiving a user selection of a beverage to be brewed in the at least one infusing chamber at selection keys on the cabinet.

19. The method of claim 11, wherein the first mesh size and the first spout enable the infusing chamber to brew a first beverage, and wherein the second mesh size and the second spout enable the infusing chamber to brew a second beverage different than the first beverage.

20. The method of operating at least one modular infuser system including a back plate assembly, a belt assembly mounted on a front of the back plate assembly and supporting a continuous filter belt, the belt assembly configured to rotate the filter belt in two opposite directions, only one direction at a time, the belt assembly including an annular seal below a portion of the filter belt and a funnel molding directing liquid passing through the filter belt toward a spout, and an infusing chamber movably mounted on the front of the back plate assembly above the belt assembly, the method comprising:
during brewing of a beverage, selectively moving the infusing chamber between a clamped position in which a bottom of the infusing chamber clamps to the seal through the filter belt and a raised position in which a bottom of the infusing chamber is spaced apart from the filter belt; and rotating the filter belt in either of the two opposite directions while the infusing chamber is in the raised position to remove waste from the filter belt;

removing waste from the filter belt with a first wiper arm and a second wiper arm disposed on opposite sides of the funnel molding and positioned to brush against the filter belt, wherein when the filter belt moves clockwise, the first wiper arm removes waste from the filter belt, and when the filter belt moves counterclockwise, the second wiper arm removes waste from the filter belt.

* * * * *